United States Patent [15] 3,698,013

Hossmann et al. [45] Oct. 10, 1972

[54] CIRCUIT ARRANGEMENT FOR AN ELECTRONIC DISTANCE MEASURING DEVICE FOR DRAWING THE FREQUENCY OF A MEASURING OSCILLATOR TOWARDS A SET POINT FREQUENCY WHICH IS HIGHER OR LOWER, RESPECTIVELY, BY A CERTAIN PREDETERMINED VALUE

[72] Inventors: Marcel Hossmann, Zurich; Alfred Barh, Turgi, both of Switzerland

[73] Assignee: Albiswerk Zurich AG, Zurich, Switzerland

[22] Filed: June 28, 1971

[21] Appl. No.: 157,378

[30] Foreign Application Priority Data

July 10, 1970 Switzerland.............10474/70

[52] U.S. Cl.......................343/7.5, 331/1 A, 331/18, 343/7 A

[51] Int. Cl..............................................H03b 3/04

[58] Field of Search.......331/1 A, 18; 343/5 DP, 7 A, 343/7.5, 12

[56] References Cited

UNITED STATES PATENTS

| | | |
|---|---|---|
| 3,200,399 | 8/1965 | Schneider et al. ........343/12 R |
| 3,213,449 | 10/1965 | Koboyashi et al.........343/12 R |
| 3,430,237 | 2/1969 | Allen..........................343/7.5 |
| 3,611,175 | 10/1971 | Boelke.......................331/1 A |

*Primary Examiner*—Benjamin A. Borchelt
*Assistant Examiner*—R. Kinberg
*Attorney*—Werner W. Kleeman

[57] ABSTRACT

A circuit arrangement for an electronic distance measuring device for drawing the frequency of a measuring oscillator towards a set point frequency which is higher or lower, respectively, by a certain predetermined amount or value than the frequency of a similar measuring oscillator at the counter station. From the measuring waves of both measuring oscillators there is produced at such circuit arrangement, by mixing, a differential signal. The circuitry of the invention also contains a discriminator circuit which compares the frequency of the differential signal with a reference frequency corresponding to the aforesaid predetermined amount and upon deviation of this differential signal from the reference frequency there is produced an error voltage for drawing or shifting the frequency of such measuring oscillator.

1 Claim, 4 Drawing Figures

CIRCUIT ARRANGEMENT FOR AN ELECTRONIC DISTANCE MEASURING DEVICE FOR DRAWING THE FREQUENCY OF A MEASURING OSCILLATOR TOWARDS A SET POINT FREQUENCY WHICH IS HIGHER OR LOWER, RESPECTIVELY, BY A CERTAIN PREDETERMINED VALUE

BACKGROUND OF THE INVENTION

The present invention relates to a new and improved circuit arrangement for an electronic distance measuring device for drawing or shifting the frequency of a measuring oscillator towards a set point frequency which is higher or lower, respectively, by a certain predetermined value or amount than the frequency of an identical measuring oscillator at the counter or opposite station, and at which circuit arrangement a differential signal is generated from the measurement waves of both measuring oscillators by mixing and, furthermore, at which there is present a discrimination circuit which compares the frequency of the differential signal with a reference frequency corresponding to the aforesaid predetermined amount and upon deviation from the reference frequency generates an error voltage or signal for drawing or shifting the frequency of such measuring oscillator.

In high-frequency engineering oftentimes the problem exists of controlling the frequency of a first oscillator with respect to the frequency of a second oscillator. This problem also prevails in electronic distance measuring devices where, for the purpose of measuring the distance between two terminal points of a path which is to be measured, a measuring wave is transmitted in both directions. Both measuring waves possess different frequencies from one another and can be modulated upon a carrier wave. At both receivers the received measuring wave is mixed with the transmitted measuring wave, to thus produce a respective differential signal. The differential signal appearing at one terminal point, at the auxiliary station, is transmitted to the other terminal point, the main station. The last-mentioned station is equipped with a phase measuring device by means of which the phase difference between the transmitted and the generated differential signal is measured and from such measurement there can be determined in known manner the distance between both terminal points of the path. When utilizing digital phase measuring devices, the frequency of a differential signal must be maintained quite exact for well known reasons. In accordance with the teachings of a known distance measuring installation, for the purpose of maintaining constant the differential signal, the frequency of the measuring wave produced at the auxiliary station is controlled. The differential frequency appearing at the auxiliary station is compared by means of a frequency discriminator with the frequency of a reference oscillator and an error voltage or signal is produced which corresponds to such deviation, this error signal then serving to control the measuring oscillator present at such station. The frequency discriminator used to compare both frequencies is quite complicated in design. It contains mixing stages at which the frequencies to be compared are mixed, and wherein the reference signal for the one mixing stage is delivered phase-displaced by $\pi/2$. The outputs of both mixing stages are fed directly or through the intermediary of a differentiating element to a phase-controlled demodulator which delivers a frequency-dependent error signal for controlling the measuring oscillator.

The known arrangement has the drawback that it is very complicated and is not sufficiently frequency accurate.

SUMMARY OF THE INVENTION

Therefore, it is a primary object of the present invention to provide a novel circuit arrangement for electronic distance measuring devices which effectively overcomes the aforementioned drawbacks of the prior art constructions.

Still a further significant object of the present invention relates to a new and improved circuit arrangement for an electronic distance measuring device for drawing the frequency of a measuring oscillator towards a reference frequency which is higher or lower, respectively, by a certain predetermined value than the frequency of a similar measuring oscillator at a counter station, and wherein the circuitry useful for obtaining this function is relatively simple in design and construction.

Yet a further extremely significant object of the instant invention relates to a novel circuit arrangement for an electronic distance measuring device for drawing the frequency of a measuring oscillator towards a set point frequency which is higher or lower, respectively, by a certain predetermined amount or value than the frequency of a similar measuring oscillator at the counter station, and at which circuit arrangement from the measuring waves of both measuring oscillators there is produced by mixing a differential signal and at which circuitry there is also present a discriminator circuit which compares the frequency of the differential signal with a reference frequency corresponding to the aforesaid predetermined amount and upon deviating from the reference frequency generates an error voltage for drawing or shifting the frequency of such measuring oscillator.

Now, in order to implement these and still further objects of the present invention, the inventive circuit arrangement is manifested by the features that there is provided an exclusive NOR-gate at the inputs of which, on the one hand, there is applied the differential signal and, on the other hand, the reference signal. A low-pass filter consisting of two series connected resistors and a subsequently connected capacitor follows the exclusive NOR-gate. The junction point between the resistor and the capacitor leading to a current source and such capacitor being bridged by a switch controlled by the differential signal. This switch is in open condition during the presence of a differential signal. Furthermore, there is also provided an OR-circuit which conducts or passes the momentarily greater input voltage. The first input of such OR-circuit is connected with the output of the first low-pass filter and the second input of such OR-circuit has applied thereto a pre-bias voltage which draws the measuring oscillator to a frequency which is between the fundamental frequency and the set point frequency. The output of the OR-circuit communicates via at least one further low-pass filter with the frequency control-input of the oscillator.

The new and improved circuit arrangement of this invention has as one of its advantages that it is of very simple construction. By delivering the pre-bias voltage the frequency of the measuring oscillator is initially controlled to a point which is between the fundamental frequency of the measuring oscillator and the set point frequency to which the measuring frequency should be drawn. By means of the C-element of the last low-pass filter there is built-up a control voltage which increases up to a value at which there is attained the reference frequency and at which there is regulated such a phase between the differential signal and the reference signal so as to maintain the reference frequency (phase synchronization).

It will be understood from the explained mode of operation of the circuit arrangement that the reference value can be adjusted with extreme accuracy, affording a further advantage of the inventive circuit arrangement.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
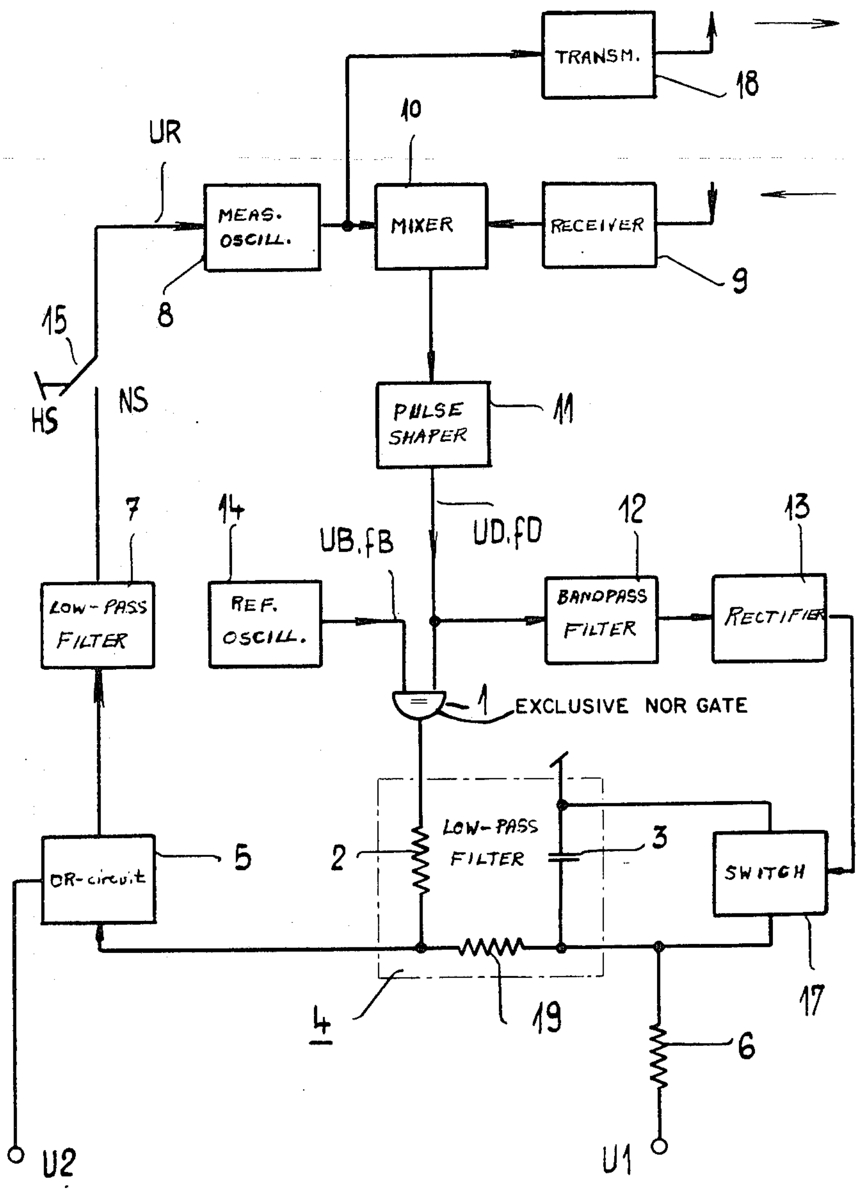
FIG. 1 is a block circuit diagram of the inventive circuit arrangement in an electronic distance measuring device for drawing the frequency of a measuring oscillator towards a set point frequency which is greater by a certain predetermined amount or value than the frequency of a similar measuring oscillator at the counter station.

Describing now the drawings, at the distance measuring device, at which the exemplary embodiment of the inventive circuit arrangement is utilized and arranged, there is provided a measuring oscillator 8 for producing a measuring signal or wave. The circuit arrangement can be switched-in and switched-out so as to enable the measuring oscillator 8 to oscillate at the fundamental frequency f1 or can control such to a reference frequency *f*2 which is greater by a certain given amount or value. This measuring wave or signal is transmitted by a transmitter 18 to the momentary opposite or counter station of the distance measuring device. The measuring wave transmitted to the counter station is received by a receiver 9. The measuring wave produced by the measuring oscillator 8 and the measuring wave received by the counter station are delivered to a mixing stage or mixer 10. At the output of the mixing stage 10 there is arranged a pulse shaper 11 for shaping the produced sinusoidal-shaped differential signal into a square wave-shaped differential signal UD. Furthermore, there is provided an exclusive NOR-gate 1 at which, on the one hand, there is delivered the differential signal UD and, on the other hand, a reference signal UB. A reference oscillator 14 is provided for the purpose of producing reference signal UB. The frequency of the reference signal fB amounts to the value through which the measuring frequencies of both stations should differ. A first low-pass filter 4 is arranged in circuit after the exclusive NOR-gate 1. Low-pass filter 4 consists of two series connected resistors 2 and 19 and a subsequently connected capacitor 3. The junction point between the resistor 19 and the capacitor 3 of this low-pass filter 4 is electrically coupled with a current supply or source. This current source is here shown formed by voltage supply U1 and resistor 6. The capacitor 3 of the RC-element is bridged by switch 17 which is controlled by the differential signal UD. Such control occurs through the agency of a wide-band bandpass filter 12 which is matched to the differential frequency fD and a rectifier or rectification stage 13 in such a manner that upon the presence of the differential signal UD the switch 17 is opened.

At the output of the first low-pass filter 4, there is provided an OR-circuit 5 which always passes or conducts the larger input voltage. The first input of this OR-circuit 5 is coupled with the output of the first low-pass filter, as shown. At the second input is applied a pre-bias voltage U2 which draws or shifts the oscillator 8 to a frequency which is between the fundamental frequency *f*1 and the set point frequency *f*2.

The output of the OR-circuit 5 is coupled, through the intermediary of a further low-pass filter 7 and a switch 15 for switching-in the control, with the frequency control input of the measuring oscillator 8, as shown.

Figures 2, 2A, 2B, 2C, 2D, 2E, 2F, 2G, 2H, 2I, 2K, 2L:
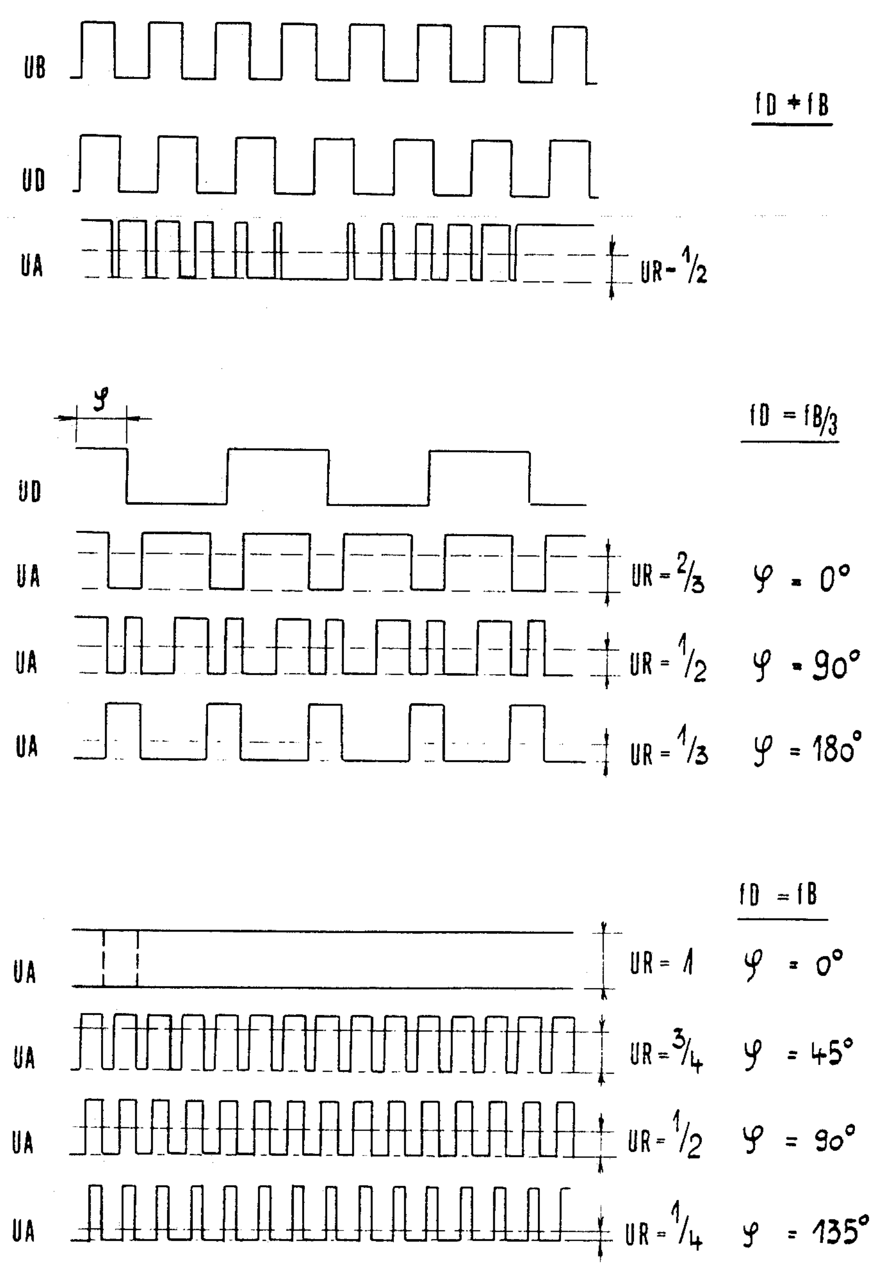
FIG. 2, embodying the sub-FIGS. 2a to 2l inclusive, graphically illustrates the output voltage of the exclusive NOR-gate as well as the magnitude of the resultant control voltage for different differential frequencies and for different phase angles between the differential signal and the reference signal.

FIG. 2*a* graphically illustrates the course of the reference signal UB having the frequency fB.

FIG. 2*b* graphically illustrates the differential signal UD, the frequency *f*D of which is not a integer fraction or portion of the reference frequency *f*B. In FIG. 2*c* there is graphically illustrated the generated output voltage UA. This is switched by the exclusive NOR-gate 1 between the standardized or normalized values 0 and 1. After filtering the alternating-current components by means of the low-pass filters 4 and 7, there is thereby produced a control voltage UR, the magnitude of which corresponds to the average value of the output voltage UA. The standardized values of the control voltage UR are always given at the right side of the graphs.

In FIGS. 2*d* to 2*g* there are illustrated the relationships for a differential signal UD, the frequency *f*D of which is one-third of the reference frequency *f*B. FIGS. 2*e* and 2*g* illustrate the output voltage UA and the resultant control voltage UR for different phase angles $\phi$ of the differential signal UD with respect to the reference signal UB.

In FIGS. 2*h* to 2*l* there is illustrated the output signal UA and the resultant control voltage UR for a differential frequency *f*D which is equal to the reference frequency *f*B, and specifically for different phase angles $\phi$ between both of the signals UB and UD.

Figure 3A:
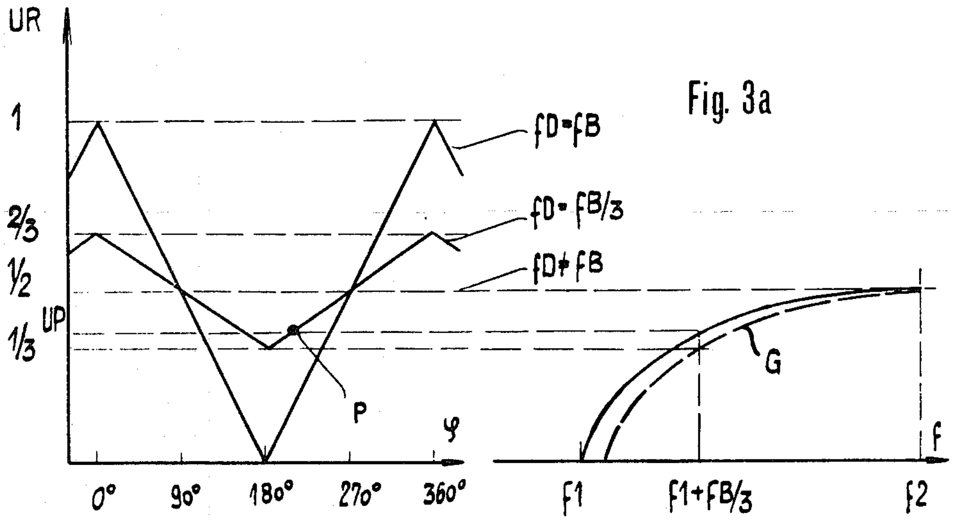
FIG. 3, embodying the sub-FIGS. 3*a* and 3*b*, portrays respective graphs which plot, for different differential frequencies, the control voltage as a function of the phase angle.

At the left of FIG. 3*a* there is illustrated the course of the control voltage UR as a function of the phase angle $\phi$. At the differential frequency $fD = fB$ or $fD = fB/3$ there is produced the curve envelopes illustrated in FIG. 3a. At the frequencies $fD$ which do not constitute any uneven integer fraction or portion of the reference frequency $fB$ there is obtained, independent of the phase angle, a control voltage UR with the standardized value of one-half. AT the right side of FIG. 3a there is plotted the control characteristic of the measuring oscillator 8 and specifically for the frequency range extending between the fundamental frequency f1 and the reference frequency f2. Experience has shown that the measuring oscillator 8 possesses frequency fluctuations. Thus, there are produced displaced control characteristics with respect to the abscissa. One such displaced control characteristic has been represented, by way of example, by the curve G.

Figure 3B:
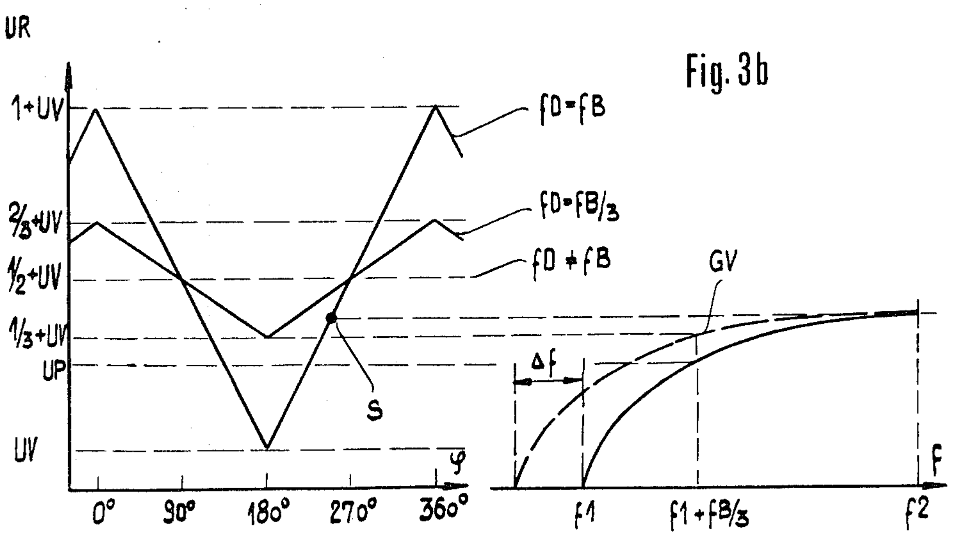

FIG. 3b plots the same diagrams as FIG. 3a, however, with the difference that the control voltage UR is increased by the delivery of current from the current source U1, 6.

Having had the benefit of the foregoing description of the inventive circuit arrangement, the function thereof will now be considered and is as follows:

At the circuit arrangement at one station the regulating control for the measuring oscillator 8 is switched-out. The switch 15 is located in the position HS. The frequency control input of such measuring oscillator 8 is thus connected with ground so that such oscillates at its fundamental frequency $f1$.

At the circuit arrangement at the other station the regulating control of its measuring oscillator 8 is switched-in. Its switch 15 is in the position NS. The frequency control input of such oscillator 8 is now coupled to the control circuit. By delivering the pre-bias voltage U2 via the OR-circuit 5 the oscillator frequency is shifted to a frequency which is between the fundamental frequency $f1$ and the set point frequency $f2$ to which it is intended to bring such measuring oscillator 8. Owing to this fixed adjustment of the oscillator frequency there is achieved the condition that the differential frequency is unequal to null.

The measuring wave received by the receiver 9 from the counter station possesses the fundamental frequency $f1$. At the mixing stage 10 this measuring wave is mixed with the measuring wave of its own measuring oscillator 8 which, owing to the previously explained fixed adjustment by the pre-bias U2 is different from f1. Therefore, in known manner there appears a differential signal UD possessing a frequency $fD$ corresponding to the difference of both measuring waves or signals. Owing to the appearance of a differential signal UD the controllable switch 17 is opened through the agency of the bandpass filter 12 and the rectification stage 13.

Now from the output of the exclusive NOR-gate 1 and from the voltage source U1 currents flow to the capacitor 3, so that a voltage builds-up at this capacitor. As soon as the voltage which appears at the output of the low-pass filter 4 exceeds the pre-bias voltage U2, such is switched through or conducted by OR-circuit 5. The second low-pass filter 7 serves for the further filtering-out of the alternating-current components.

It is assumed that the oscillator frequency is brought to a frequency by virtue of the pre-bias U2, by means of which there is produced a differential signal UD, the frequency $fD$ of which is not an uneven integer fraction or portion of the reference frequency $fB$. There appears an output voltage UA corresponding to that shown in FIG. 2c, and which now in accordance with the charging curve charges the C-elements of the low-pass filters 4, 7. Consequently, the oscillator frequency is adjusted towards the set point frequency f2. Also, during changing frequency of the oscillator 8 an output voltage UA possessing the average or mean value of one-half is delivered by the exclusive NOR-gate 1, with the exception only of the frequencies at which a differential frequency $fD$ appears which amounts to an uneven integer fraction of the reference frequency $fB$. At these differential frequencies $fD$ there is produced an average value which is dependent upon the phase angle $\phi$. In the indicated examples according to FIGS. 2d – 2g, where the differential frequency $fD$ amounts to one-third of the reference frequency $fB$ the mean or average value of the output voltage UA for certain phase angles $\phi$ becomes smaller than one-half, namely one-third. It is for this reason that charging of the C-elements of the low-pass filters 4 and 7 is interrupted when passing through the frequency $f1 + fB/3$. Now in accordance with the conditions which have been illustrated in FIG. 3a at point P there is regulated a stable control condition in that at the frequency $f1 + fB/3$ the phase-dependent control voltage UR assumes the value UP which is just large enough to maintain this frequency and the obtained phase angle. During a deviation of the fundamental frequency owing to any kind of instability the shifting or drawing of the oscillator frequency occurs along a control line or characteristic which is displaced somewhat with respect to the abscissa, as shown. If the deviation occurred at a higher frequency, then, the critical frequency $f1 + fB/3$ will pass through a smaller control voltage UR than if one starts with the exact frequency $f1$. In the event that for obtaining the frequency $f1 + fB/3$ there is required a smaller voltage than the value one-third, then at this frequency charging of the C-elements is not interrupted. An erroneous adjustment is thus impossible. As can be readily seen from FIG. 3a, there results a boundry characteristic G at which an erroneous adjustment is just no longer possible The possible error or erroneous adjustment at the frequency $f1 + fB/3$ is undesired, therefore measures must be provided to prevent such effect. The measure for preventing the regulatory control to an undesired frequency resides in the delivery of an additional current from the current source U1 via the resistor 6. The effect of this current is apparent from the showing of FIG. 3b. By virtue of the additional current the control voltage UR is increased by a value UV, so that at the frequency $f1 + fB/3$ such is greater than the voltage UP, required for shifting to this frequency. The charging of the C-elements of the low-pass filters 4, 7 is no longer interrupted at the frequency $f1 + fB/3$, since the charging voltage for the C-elements at this frequency is always greater than the value UP.

As can be seen from FIG. 3b, owing to the pre-bias UV the boundry characteristic is shifted towards lower frequencies. GV represents the displaced boundry characteristic. Such can be obtained in that the fundamental frequency of the oscillator 8 can shift up to an amount $\Delta f$ towards the lower frequencies without an error adjustment occurring during drawing towards the set point frequency $f2$.

The control voltage increases towards the value ½ + UV and displaces the frequency of the measuring oscillator 8 up to the set point frequency $f2$. At the frequency $f2$ there is regulated such a phase angle $\phi$ between the differential signal UD and the reference signal UB, at which at the point S there is generated just the required control voltage UR for maintaining this frequency $f2$ and the obtained phase angle $\phi$.

While there is shown and described present preferred embodiments of the invention, it is to be distinctly understood that the invention is not limited thereto but may be otherwise variously embodied and practiced within the scope of the following claims. Accordingly,

What is claimed is:

1. A circuit arrangement for an electronic distance measuring device for shifting the frequency of a measuring oscillator to a set point frequency higher or lower, respectively, by a certain CERTAIN predetermined amount than the frequency of a similar measuring oscillator at a counter station, said circuit arrangement through mixing of the measuring waves of both measuring oscillators producing a differential signal, said circuit arrangement further incorporating a discrimination circuit for comparing the frequency of the differential signal with a reference frequency corresponding to the predetermined amount and upon deviation from the reference signal producing an error voltage for shifting the frequency of such controlled measuring oscillator, the improvement comprising an exclusive NOR-gate provided for said circuit arrangement and defining the discrimination circuit, said exclusive NOR-gate having at least one pair of inputs and an output, at one of said inputs of said exclusive NOR-gate there is applied the differential signal and at the other input of which there is applied the reference signal, low-pass filter means having an output, said low-pass filter means being arranged in circuit with and following sad exclusive NOR-gate, said low-pass filter means embodying two series connected resistors and a subsequently connected capacitor, means defining a current supply leading to the junction between one of said resistors and said capacitor, switch means controlled by the differential signal bridging said capacitor, said switch means upon the presence of said differential signal being open, an OR-circuit for conducting the momentary greater input voltage supplied thereto, said OR-circuit having a first input, a second input and an output, said first input of said OR-circuit being connected with the output of said low-pass filter means, means for applying a pre-bias voltage to the second input of said OR-circuit which shifts the measuring oscillator to a frequency which is between the fundamental frequency and the set point frequency, and a further low-pass filter means for electrically coupling said output of said OR-circuit with a frequency control input of such measuring oscillator.

* * * * *